3,839,548
PROCESS FOR PRODUCING SODIUM
HYDROSULFIDE SOLUTIONS
Ronnie Devell Jackson, El Dorado, Ark., assignor to
Lion Oil Company
Filed Oct. 13, 1972, Ser. No. 293,629
Int. Cl. B01d 59/22; C01b 17/32
U.S. Cl. 423—560
16 Claims

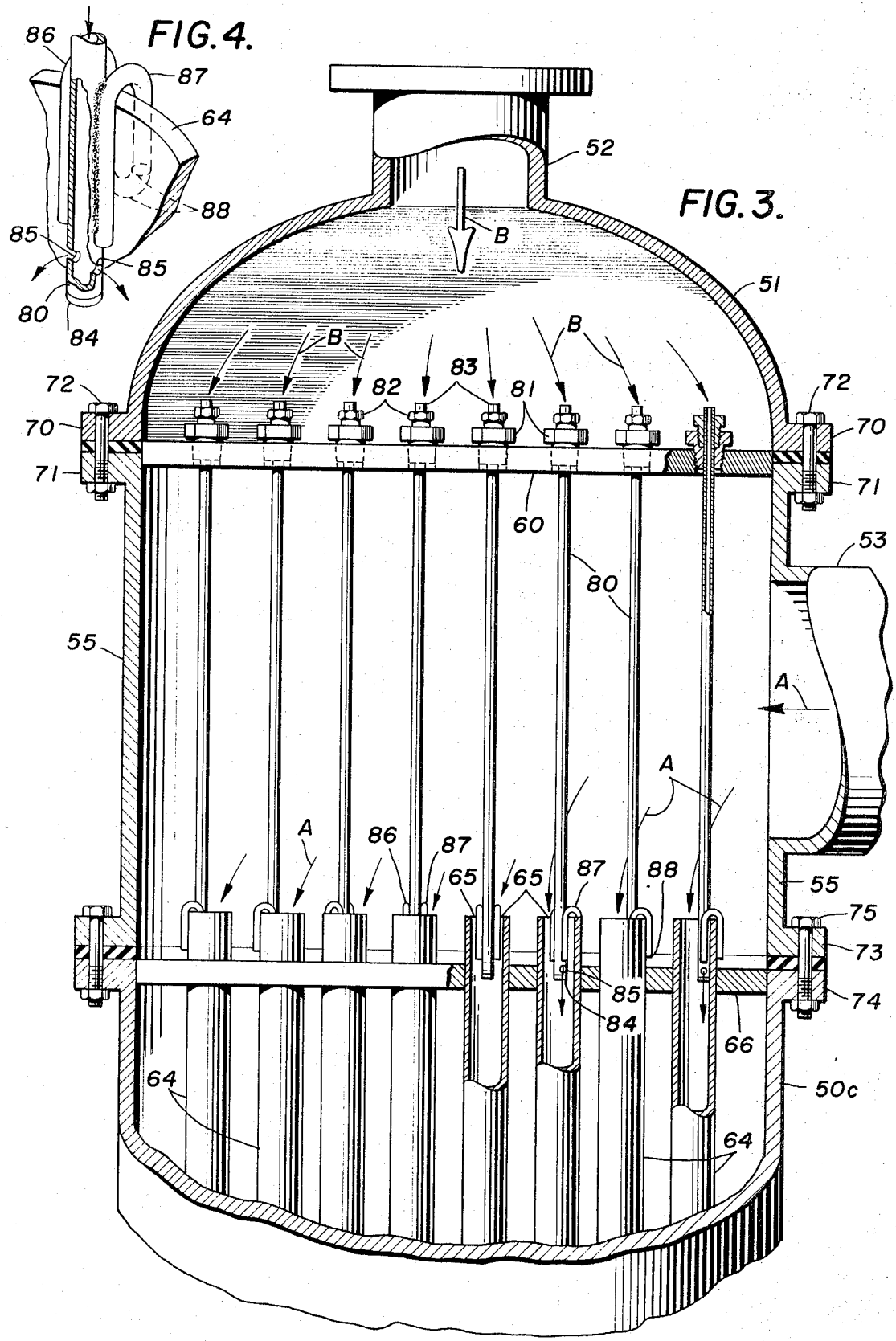

ABSTRACT OF THE DISCLOSURE

A process for producing sodium hydrosulfide solutions substantially free of sodium carbonate from a refinery sour gas by contacting refinery sour gas with a fresh aqueous sodium hydroxide solution in cocurrent interfacial two-phase flow and separating a sweet gas substantially free of hydrogen sulfide. There is also disclosed a novel liquid-gas two-phase interfacial flow reactor designed for use in the process. The sodium carbonate free solutions of sodium hydrosulfide are useful in the sulfate paper industry.

BACKGROUND OF THE INVENTION

The present application deals with a process for producing improved aqueous solutions of sodium hydrosulfide from readily available sources and suitable for many uses in industry. Trade requirements for useful sodium hydrosulfide solutions require that they be relatively concentrated and, although sodium carbonate is present in the sulfate paper process pulp treating solutions, it is desirable that sodium hydrosulfide solutions be substantially free of sodium carbonate for economic and solubility reasons.

In many cases solutions of sodium hydrosulfide and other sodium compounds are prepared from refinery waste streams, including waste caustic streams and sour gas streams generated by refining processes. In particular, refinery sour gas streams are an economical source of hydrogen sulfide which can be converted into sodium hydrosulfide solutions of value in the sulfate paper and other industries. However, such refinery sour gas streams generally contain in addition to gaseous hydrocarbons and hydrogen sulfide a considerable carbon dioxide content as well as other impurities. In order to make these streams useful as sources of sodium hydrosulfide either a solution containing a considerable carbonate content must be accepted, though not desired, or methods for selective absorption of hydrogen sulfide must be developed.

SUMMARY OF THE INVENTION

Therefore, the primary object of the present invention is the provision of a process for producing from a refinery sour gas containing both hydrogen sulfide and carbon dioxide a sodium hydrosulfide solution of from 20 to 40% concentration substantially free of sodium carbonate. Another object is the provision of a process for reducing the hydrogen sulfide content of a refinery gas stream to not more than 1% by weight at standard conditions. A further object is a provision of a new type of gas-liquid contact reactor adapted to produce such a sodium hydrosulfide solution substantially free of sodium carbonate. A still further object is the provision of an economical process for producing such sodium hydrosulfide solutions and sweet gas streams and a novel apparatus for carrying out such process.

It has now been found that selective absorption of hydrogen sulfide practically to the exclusion of absorption of carbon dioxide and its conversion to sodium carbonate can be achieved if certain conditions are observed and a particularly selective method of gas-liquid contact is carried out. The contacting method which makes possible the improved process is one which can be denominated as continuous concurrent two-phase interfacial flow or, more particularly, thin film liquid flow with a distinct interface being maintained between the liquid film and the high velocity turbulent gas. Such a novel type of gas-liquid contact is not realized in the normal tower reactors, whether packed or plate types, or any reactor wherein the liquid absorbent solution is given long contact times or bulk mixed with a moving gas stream. Also, these types of equipment make uniform temperature control of the reaction mixture impractical. Consequently, particular types of thin liquid film gas-liquid interface reaction vessels are required to provide interfacial contact, precise temperature control, and very short reaction times. A preferred form of novel gas-liquid reactor which has been found particularly suitable is described herein.

BRIEF DESCRIPTION OF THE DRAWING

FIG. 3 is a partial sectional view of another from of the two-phase contact reactor of the present invention. FIG. 4 is an enlarged perspective view of one feature of FIG. 3.

EMBODIMENTS OF THE INVENTION

Figure 1:
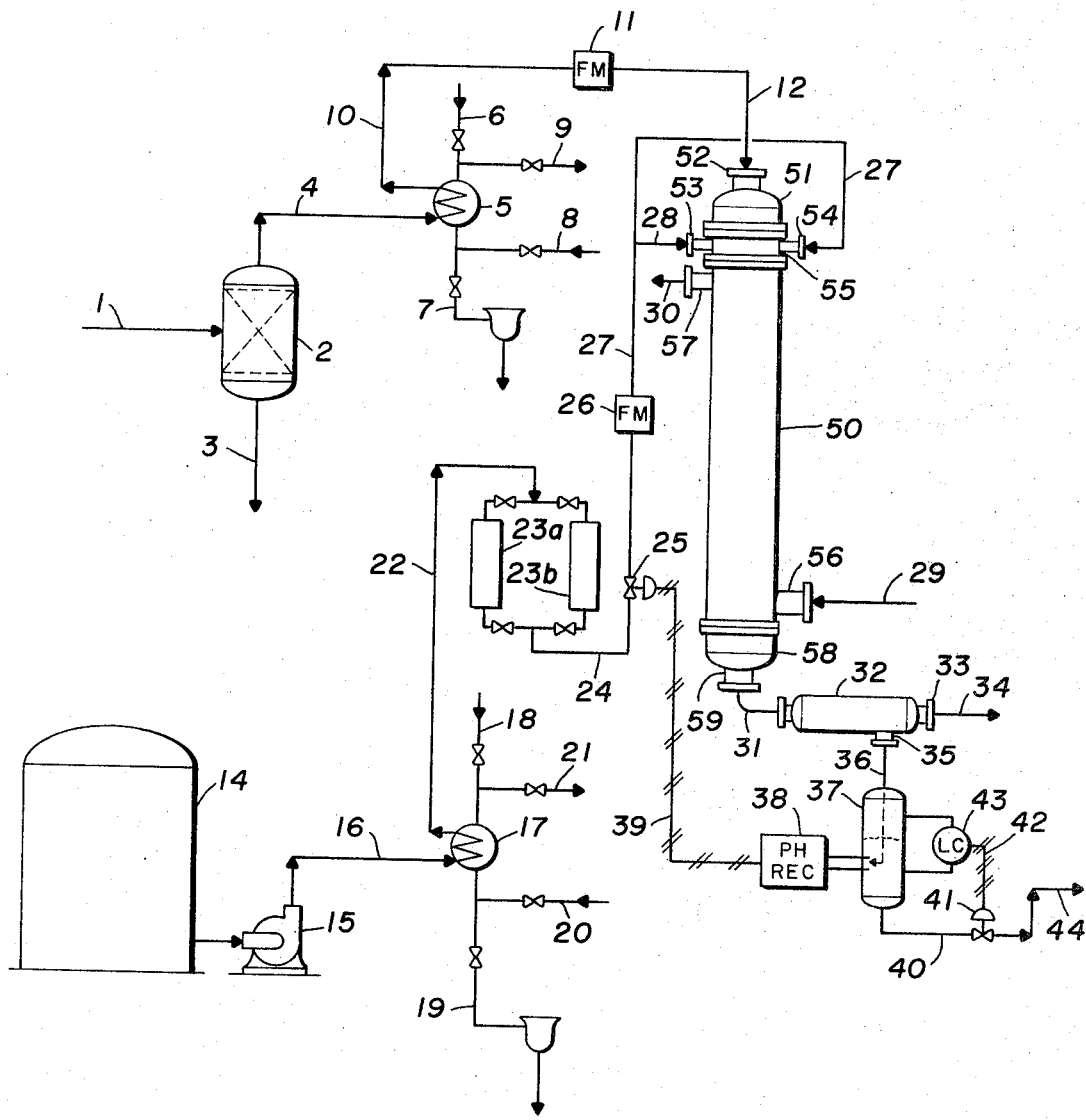
FIG. 1 is a diagrammatic representation of the process of the present invention.

There are several considerations which must be observed if the objects of the present invention are to be achieved. Due to the differences in the rates of absorption and activity of hydrogen sulfide and carbon dioxide gases in caustic solutions and particularly in fresh sodium hydroxide solutions the selectivity for the absorption of hydrogen sulfide is favored by reaction at the gas-liquid interface. Likewise, hydrogen sulfide absorption is favored over carbon dioxide absorption by short contact times between the gas and liquid phases, by relatively low temperature, by minimizing bulk mixing of the gas and liquid phases, by low pressure, and by cocurrent flow of the reaction mixture.

The composition of the sour refinery gases which can be utilized by the present process is not critical and they can be derived from many different operations. Generally such gases will consist of hydrogen and relatively light hydrocarbons which are not readily condensed such as methane, ethane, ethylene, propane and propylene, though the gas stream can also contain small amounts of $C_4$ and $C_5$ hydrocarbons. In addition such refinery sour gas streams will contain varying amounts of hydrogen sulfide and carbon dioxide depending on the nature of the feed stock to the refinery and the specific refinery processing operations which have been conducted for the generation of the various streams of sour gas. While the present process is effective to remove relatively small quantities of hydrogen sulfide of 1% and less from such gases it is generally more economic if the sour gas or mixture of sour gases contain somewhat greater amounts of $H_2S$ such as from 1 to 10% or greater. Likewise, all such gases will have a certain amount of carbon dioxide present ranging from 0.1 to as much as 10% by weight of the gas. The selective absorption feature of the present process is applied to a gas containing considerable amounts of such $CO_2$ such as from 1 to 10% by weight. In general it is preferred to condense and separate those hydrocarbons of greater than $C_3$ so as to avoid liquid hydrocarbon contamination of the sodium hydrosulfide product.

The composition of a typical refinery gas stream will generally fall within the following ranges:

|  | Mole percent |
|---|---|
| Hydrogen | 20–40 |
| Methane | 20–40 |
| Ethane | 10–30 |
| Ethylene | 2–20 |
| Propane | 2–20 |
| Propylene | 0.5–10 |
| $C_4HCs$ | 0.1–10 |
| $C_5HCs$ | 0.1– 5 |
| $H_2S$ | 1–10 |
| $CO_2$ | 0.1–10 |

A typical refinery sour gas stream has the compositions set out below.

|  | Mole percent |
|---|---|
| Hydrogen | 30.3 |
| Methane | 31.0 |
| $C_2HCs$ | 17.6 |
| $C_3HCs$ | 8.0 |
| $C_4HCs$ | 2.0 |
| $C_5HCs$ | 0.8 |
| $C_6+HCs$ | 0.3 |
| $H_2S$ | 7.8 |
| $CO_2$ | 2.2 |

However, any streams containing hydrogen sulfide and carbon dioxide can be subjected to the process of the present invention.

Likewise, the specific concentration of NaOH in aqueous solution used as the absorbing solution is not particulary critical, and solutions ranging from 5 to 40% by weight of NaOH are suitable for use the present process. However, it is preferred to employ aqueous solutions ranging from 20 to 40% by weight NaOH for reasons of economy and to produce solutions of NaHS most useful in the paper industry among other users.

The method of the present invention comprises contacting a sour gas containing both hydrogen sulfide and carbon dioxide with a fresh aqueous sodium hydroxide solution in continuous cocurrent interfacial two-phase flow. The amount of relatively concentrated sodium hydroxide solution is not large with respect to the volume of sour gas treated, ranging from about .25 to 5 gallons of sodium hydroxide solution per 1,000 s.c.f. of sour gas, depending on the percentage hydrogen sulfide in the sour gas stream. The temperature and pressure conditions of the present process are not particularly critical. However, it is preferred that high temperature and pressure be avoided both for reasons of economy and for maintaining a high efficiency in the selective absorption of $H_2S$ in contrast to absorption of $CO_2$. Therefore, it is preferred to operate the process at temperatures of from about 50 to 150 F. and most preferably below 125 F. Likewise, it is preferred that pressures in the contact reactor be maintained at from atmospheric to about 100 p.s.i.g., and most preferably below 50 p.s.i.g.

Contact times between the refinery gas and aqueous NaOH solutions are preferably kept very short in order to provide for highly selective absorption of $H_2S$ as opposed to $CO_2$. Thus, it is preferred to provide a contact time of from 0.2 to 2 seconds and preferably less than 1 second. This can be achieved by maintaining a relatively high linear velocity in the refinery gas feed to the process. In general, it is preferred that the gas feed be maintained at a velocity of from about 60 to 150 ft./sec. and preferably from about 80 to 120 ft./sec. In order that the time of contact between the gas and caustic solution at the interface be kept low the gas is maintained at a high linear velocity as noted above while the flow rate of the sodium hydroxide solution is maintained between .25 and 5 gallons per 100 s.c.f. of sour gas. The reaction between the hydrogen sulfide and sodium hydroxide is exothermic in nature and hence some means of removing the heat of the reaction, either by a cooling fluid or otherwise, should be provided in order to keep the temperature in the above preferred range.

When the process of the present invention is carried out in the manner described above very useful sodium hydrosulfide solutions of from 20% to 40% by weight are produced containing less than 2.0%, and frequently less than 1.0% by weight of sodium carbonate along with a sweet gas stream with less than 1.0% and frequently less than 0.5% hydrogen sulfide by weight. Not only are valuable sodium hydrosulfide solutions useful in the paper industry and elsewhere produced, but there is also produced a sweet gas stream relatively free of hydrogen sulfide which is suitable for further processing or burning as fuel for refinery operations which is free of environmental pollution effects from sulfur compounds such as sulfur dioxide and the like.

The process of the present invention has been found to be particularly advantageous since it affords highly selective absorption of hydrogen sulfide as opposed to the absorption of any carbon dioxide present in the gas feed to the process. Thus it has been found that when operating in accordance with the present invention the ratio of moles of hydrogen sulfide absorbed to moles of carbon dioxide absorbed when both are present in the sour gas feed ranges from about 20:1 to as high as 60:1 and above. Thus the process of the present invention is uniquely advantageous for the production of sodium hydrosulfide solutions substantially free of undesired sodium carbonate which solutions are desirable for use in the paper industry as well as for other uses.

It is apparent that the present invention can be carried out in any type of reaction wherein continuous cocurrent interfacial two-phase flow is maintained, such as a thin film contact apparatus, a single tubular reactor or the like. A highly suitable and preferred reactor adapted for use in the process of the present invention is the water cooled tubular reactor designed to provide for two-phase interfacial or annular flow as more fully described below.

Reference to FIG. 1 of the drawing, which is diagrammatic representation of the process of the present invention including ancillary supply and control means, will illustrate the overall process. Sour gas from any of many various refinery operations is brought to the process by line 1 and passed to liquid separator 2 wherein any hydrocarbons heavier than $C_3$ which have condensed will be removed for recycle or other use via line 3. The sour feed gas freed of liquid hydrocarbons is then passed via line 4 to a heat exchanger 5 for establishing the gas at the desired temperature for inlet to the reactor. The exchanger 5 is supplied with sources of steam for heating entering via line 6 and exiting via line 7 or cooling water entering via line 8 and exiting via line 9. From the heat exchanger 5 the gas now at the desired inlet temperature is passed via line 10, flow meter 11 and line 12 to fluid inlet port 52 of the upper section 51 of the two-phase interfacial flow reactor 50. A solution of sodium hydroxide of the desired concentration is stored in caustic storage tank 14 and pumped by pump 15 via line 16 to heat exchanger 17 to adjust the temperature of the solution to that desired at the inlet of the reactor. The heat exchanger 17 is likewise supplied with steam and cooling water via entry lines 18 and 20 and exit lines 19 and 21 respectively. From the heat exchanger 17 the sodium hydroxide solution of adjusted temperature is passed via line 22 to parallel caustic strainers 23A and 23B, if desired, to remove any trace solids therefrom and thereafter via line 24, flow controller 25 and flow meter 26 to the reactor 50, being supplied to the second section 55 of the reactor 50 via lines 27 and 28 to respective fluid inlet ports 53 and 54. After contact in cocurrent two-phase interfacial flow in the central tubular section of reactor 50 the sweet gas and aqueous sodium hydrosulfide solution are collected in section 58 of reactor 50 and passed therefrom via exit port 59 and line 31 to a gas-liquid separator 32. The separator 32 may be of centrifugal, gravity or other suitable type. The sweet gas freed of liquid in separator 32 is withdrawn therefrom via outlet 33 and line 34 for subsequent storage and/or use as a refinery fuel or other suitable uses. The sodium hydrosulfide aqueous solution is decanted from separator 32 via outlet port 35 and line 36 to, if desired, a surge drum 37 wherein the pH of the sodium hydrosulfide solution is determined by pH recorder 38. The signal from pH recorder 38 is passed via lines 39 to control the caustic solution flow controller 25. The level of sodium hydrosulfide solution in surge drum 37 is controlled by level controller 43 which controls flow controller 41 by means of signals passed via wire 42. An aqueous sodium hydrosulfide solution suitable for many uses is passed via line 44 to storage and/or shipping means (not shown) as desired.

Figure 2:
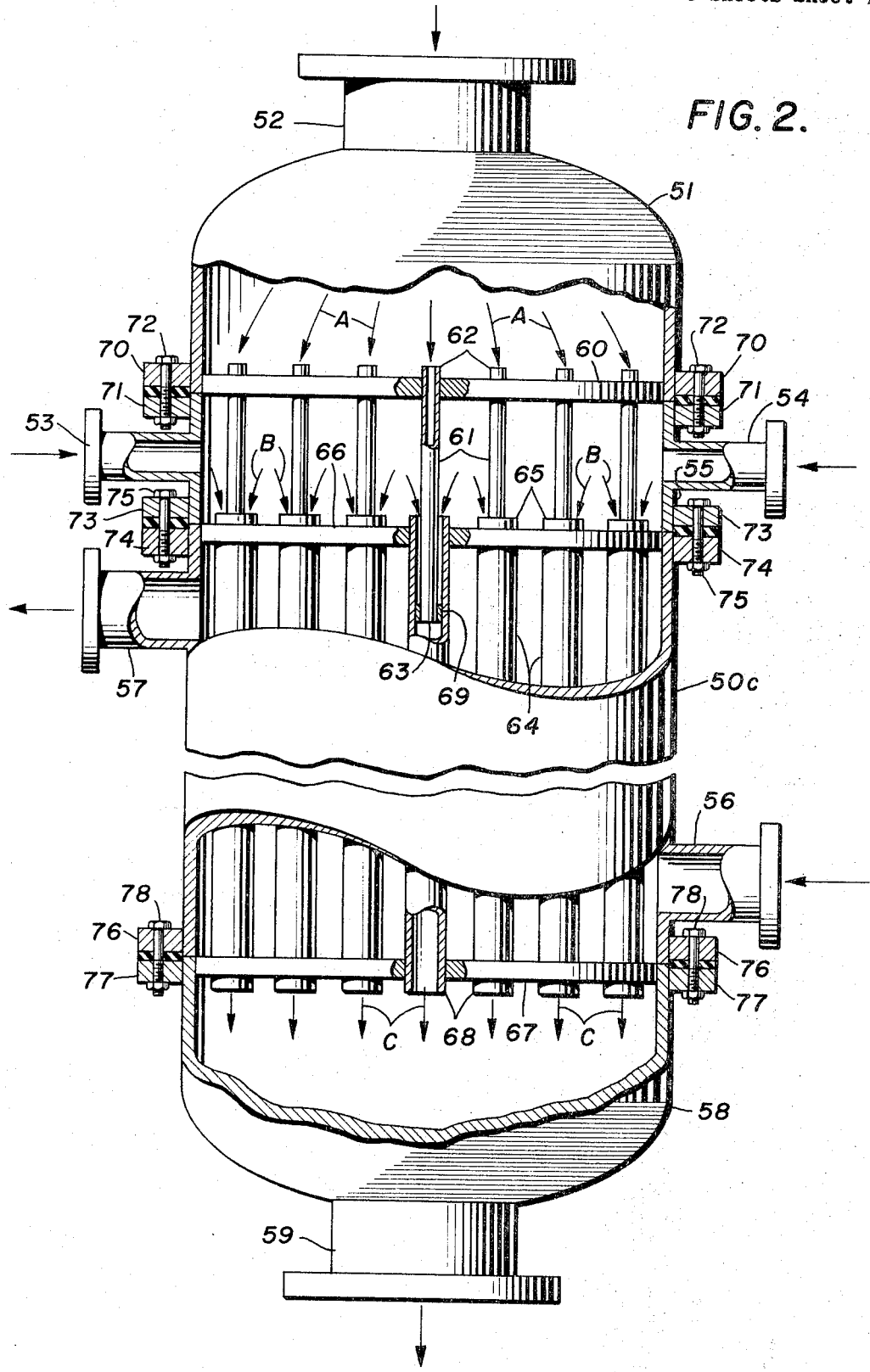
FIG. 2 is a sectional view of one form of a two-phase contact reactor of the present invention.

FIG. 2 will serve to illustrate the construction of a preferred multi-tubular liquid cooled reactor for carrying out the process of the cocurrent two-phase interfacial flow and reaction technique of the present invention. The reactor illustrated in FIG. 2 comprises three sections, a collecting header 58, a central fluid cooled reactor section 50c and a distributing header comprising two separate fluid manifold sections 51 and 55 for gases and liquids respectively. In FIG. 2 the gas distribution manifold section 51 comprises a space defined by annular walls 51 and distributor plate 60 through which pass a plurality of small diameter tubes 61 with an inlet port 52 provided in the end wall. The small diameter inner tubes 61 can be fixed in the plate 60 by any convenient means such as bushings and nipples, welding, and the like and can be terminated flush with the surface of the plate 60 or can project somewhat above the plane of the plate as shown at 62 as may be convenient or desired.

The liquid distribution manifold section 55 is comprised of the space defined by annular wall 55, the upper distributor plate 60 and a second (or liquid) distributor plate 66. Through the second distributor plate 66 pass a plurality of tubes 64 of greater internal diameter than the outside diameter of the first or interior tubes 61. These larger diameter or exterior tubes 64 can also be fixed to plate 66 in any convenient manner and can terminate flush with the bottom or top surface of the plate 66 or project above it as shown at 65. The flow of reactants through the distributor header section 51 and 55 is indicated by the arrows, the gas flow through the first manifold section 51 as shown by arrows A and the liquid flow through the second manifold section 55 as shown by arrows B, i.e. through the space defined between the outer walls of inner tubes 61 and the inner walls of the outer tubes 64.

The inner tubes 61 terminate within the outer tubes 64 a sufficient distance below the inlet end of tube 64 that annular thin film flow of liquid reactants is established on the inner walls of the tubes 64 prior to contact with the streams of gas exiting tubes 61 at the outlet end thereof 63. In order that the spacing of the inner tubes 61 within the outer tubes 64 be kept uniform for proper maintenance of annular or laminar liquid flow spacers 69 are provided between the outer and inner walls of the concentric tubes which are conveniently relatively thin and positioned at each 120° about the inner tubes 61 near the outlet ends thereof. Alternatively, a portion of the end of the walls of the inner tubes can be expanded to provide spacer means. Thus, the two sets of tubes are firmly fixed in concentric relationship.

The central reactor section 50c is comprised of the space defined by the annular walls 50c, the second distributor plate 66 and an opposite holder or floor plate 67 with a plurality of reactor tubes 64 passing through and fixed to both distributor plate 66 and floor plate 67. There are also provided in annular wall 50c one or more inlet ports 56 and outlet ports 57 for the admission and emission of a suitable cooling fluid, preferably water.

Although in the drawing the single plane of a plurality of both inner and outer reactor tubes are shown for the sake of clarity, it will be apparent that a plurality of planes each having a plurality of tubes will be positioned through the disc-shaped distributor and floor plates 60, 66 and 67, since such distribution will achieve best economy in the construction of the gas-liquid interfacial flow contact reactor.

The collecting header 58 comprises a space defined by annular walls 58 and floor plate 67 through which a plurality of reactor tubes 64 pass with an outlet port 59 in the end wall opposite the plate 67. The outlet end 68 of reactor tubes 64 are fixed to plate 67 and can be flush with the surface of plate 67 or can project beyond the lower face of plate 67 as shown, if desired. The arrows C indicate the flow of both liquid reactants from the interior walls of tubes 64 and gases through the center of said reactor tubes. The mixture of liquid and gases C are collected by the walls 58 of the collecting header and are directed from the reactor 50 via the outlet port 59 thereof. All sections of reactor 50 are provided with means for assembling the sections into a single reactor which can take any desired or convenient form. There are shown matching drilled lugs 70 and 71, 73 and 74 and 76 and 77 on opposite sides of the annular sections 51, 55, 50c and 58 adapted to be secured together by bolts 72, 75 and 78. Other conventional means of uniting the respective sections can be employed if desired.

FIG. 3 illustrates a different embodiment of cocurrent liquid-gas two-phase interfacial flow reactor in which the order of admission of the respective reactants is reversed. In the embodiment shown in FIG. 3 the first manifold section 51 is adapted for flow of liquid reactants and is comprised of a space defined by wall 51 and the first distributor plate 60 carrying a plurality of small diameter tubes 80, and with an inlet port 52 in the wall opposite plate 60. The tubes 80 pass through plate 60 and are fixed to plate 60 by any convenient means. In FIG. 3 tubes 80 are fixed by means of bushings 81 and thermocouple tubing fittings 82 but can be welded or otherwise fixedly attached to plate 60. Likewise, the inlet ends 83 of tubes 80 can be fixed flush to a surface of plate 60 or project above same as shown. The flow of liquid reactants is again shown by arrows B.

The second manifold section 55 is adapted for flow of gases and is comprised of the space defined by annular walls 55, first distributor plate 60 and second distributor plate 66 carrying a plurality of tubes 64 of greater internal diameter than the outer diameter of tubes 80, with at least one inlet port 53 for gases provided in annular wall 55. Again the plurality of tubes 64 pass through and are fixed to plate 66 in any convenient manner. The flow of gases as indicated by arrows A is into the inlet end 65 of tubes 64 and around the outside walls of tubes 80. In the embodiment shown in FIG. 3 the interior tubes 80 are of much smaller diameter than the interior diameter of the reactor tubes 64, since tubes 80 are adapted for passage of liquid reactants and also they are not positioned concentrically within tubes 64. On the contrary the portion of tubes 80 within tubes 64 are fixed to one wall of tubes 64. The outlet ends of tube 80 are closed with plugs 84 and emission of the fluid reactants is provided by one or more apertures 85 drilled in a direction normal to the annular walls of tubes 80. In this manner tubes 80 are adapted to generate a thin film annular flow of liquid reactants down the inner walls of tubes 64, while tubes 64 are adapted to convey a stream of gases through the center thereof. Thus, reactor 50 of FIG. 3 also provides for cocurrent thin-film interfacial two-phase liquid and gas flow.

The outlet end portions of tubes 80 can be fixed in any convenient manner to the inner walls of tubes 64 as by welding, brazing and the like. However, in order to provide for ease of disassembly and repair of the reactor it is preferred to fix the tubes 80 to the inner walls of tubes 64 by means of clips as shown in FIG. 3, one form of which is in greater detail in FIG. 4. The clips can comprise one or more sections of wire or small diameter tubing 86 and 87 welded to the outer walls of tubes 80 and bent at the top to provide a single offset leg or in a U-shape to form a clip about the inlet end of tubes 64 as shown. If either one or two leg sections 86 and 87 are employed as shown they can simply be terminated as at 88 on the outside of tube 64. In one preferred form the clips can be formed of a single section of wire such that both legs 86 and 87 are formed of a unitary wire bent in a U-shape at the base 88 and also bent so as to grip the end of tubes 64, as more clearly illustrated in FIG. 4. In another preferred form the clip can comprise a section of the same small diameter tubing welded to the lower portion of the inner tube and bent slightly to form an offset single leg clip. Alternatively, the end portion of the inner tubes can be formed into a spiral to grip the inner walls of the larger diameter reactor tubes, thus providing for easy disassembly without the necessity for any clip means.

The means of uniting the sections of the reactor 50 illustrated in FIG. 3 are the same as FIG. 2. Opposing drilled lugs 70 and 71 and 73 and 74 on opposite sides of the annular sections adapted for securing by bolts 72 and 75. Likewise, the reactor section 50c and collecting header can be the same as shown in FIG. 2.

The operation of the process of the present invention and the efficient selectivity of absorption of hydrogen sulfide as compared to that of carbon dioxide is illustrated by the examples set out below.

EXAMPLE 1

In this example several runs were conducted in a relatively small scale single tube cocurrent upflow reactor for the purpose of demonstrating the process of the present invention. The single tube reactor consisted of a water cooled, jacketed Type 304L stainless steel pipe of 0.375 inch outside diameter and 6 feet in length. A "T" joint mounted on the bottom end of the pipe provided for entry of the sodium hydroxide solution and an entry port just above the joint provided entry of the feed gas. Due to the small diameter of the tubular reactor thin-film liquid flow up the walls was established by providing the caustic solution to the tube after establishing the high velocity gas flow up the tube. The gas-liquid effluent overflowing the top end of the tubular reactor was directed to a centrifugal separator and decanted to a storage tank.

The refinery sour gas feed had a composition approximating the typical gas composition set out above and contained approximately 6 to 6.4% hydrogen sulfide and 1.9 to 2.1% carbon dioxide. The gas was admitted to the reactor at the flow rates set out in Table 1. There was then established the indicated flows of 27.5% by weight sodium hydroxide aqueous solution. The runs were conducted for periods of approximately 8 hours. The product aqueous solution was analyzed for its composition, the product sweet gas was analyzed for the percent removal of $H_2S$ present, and the results of these analyses are set out in Table 1 below.

TABLE 1

| Run | Flow rates | | Solution composition, wt. percent | | | | Refinery gas, percent removal $H_2S$ |
|---|---|---|---|---|---|---|---|
| | Gas, s.c.f./min. | NaOH solution, cc./min. | NaHS | $Na_2S$ | $Na_2CO_3$ | $H_2O$ | |
| A | 6.0 | 49 | 30.12 | 0 | 1.56 | 68.32 | 98.6 |
| B | 6.0 | 50 | 28.53 | 0 | .98 | 70.49 | 99.2 |
| C | 6.0 | 51.7 | 27.02 | 1.89 | 1.02 | 70.07 | 99.5 |
| D | 9.25 | 63.6 | 28.84 | 0.58 | 1.06 | 69.52 | 99.0 |
| E | 9.25 | 65 | 29.50 | 0.12 | 1.02 | 69.36 | 98.0 |
| F | 9.25 | 66.8 | 29.50 | 0 | 1.11 | 69.39 | 98.8 |

From the above date it can be seen that the process of the present invention is effective to produce aqueous solutions of sodium hydrosulfide substantially free of sodium carbonate and simultaneously effect recovery of greater than 95% of the hydrogen sulfide present in sour refinery gases. Furthermore it was found that the ratios of moles of hydrogen sulfide absorbed to moles of carbon dioxide absorbed ranged from 19:1 in Run A to 27:1 in Runs B and E averaging about 25:1.

EXAMPLE 2

In this example several runs were conducted in a tubular reactor so sized as to approximate a single tube of a multi-tube reactor. The reactor consisted of a jacketed water cooled Schedule 40 stainless steel pipe of ½" outside diameter and 16 feet in length. The internal diameter of the ½" Schedule 40 pipe was 0.622 inch and approximated the internal diameter required for the flow rates of refinery gas and sodium hydroxide solution contemplated. The distribution of reactants to the tubular reactor was accomplished by means of a "T" joint at the top end with feed refinery gas admitted through one arm thereof and a ⅛" tube led through a coupling in the other arm for admitting sodium hydroxide solution. The ⅛" tube was held by the ferrule of the "T" joint against the interior wall of the tubular reactor and projected a distance of about 6 inches therein. The gas liquid mixture which exited the bottom of the tube was collected and separated in a centrifugal separator from which product solution was decanted to a storage tank.

The single tube reactor was operated in cocurrent downflow at the flow rates set out in Table 2 below for approximately 8 hour periods. The analysis of the composition of the product solutions and the product sweetened gas for the percent removal of $H_2S$ present in the feed refinery gas are likewise set out in Table 2.

The refinery sour feed gas had approximately the analysis of the gas in Example 1 and the sodium hydroxide solution feed was a 27.5 percent by weight aqueous solution.

TABLE 2

| Run | Flow rates | | Solution composition, wt. percent | | | | Ratios absorbed, moles $H_2S$/moles $CO_2$ | Refinery gas, $H_2S$ percent removal |
|---|---|---|---|---|---|---|---|---|
| | Gas, s.c.f./min. | NaOH solution, cc./min. | NaHS | $Na_2S$ | $Na_2CO_3$ | $H_2O$ | | |
| A | 56.53 | 407 | 28.96 | 1.30 | .57 | 69.17 | 49 | 99.6 |
| B | 56.53 | 367 | 30.45 | 0 | .61 | 68.94 | 74.3 | 91.7 |
| C | 56.53 | 392 | 30.50 | 0 | .48 | 69.02 | 60 | 94.2 |
| D | 56.53 | 415 | 30.67 | 0 | .52 | 68.81 | 56 | 98.4 |
| E | 56.53 | 430 | 29.84 | .64 | .48 | 69.03 | 60 | 99.3 |

From the above data it can be concluded that the process of the present invention is effective to produce aqueous solutions of sodium hydrosulfide substantially free of sodium carbonate and simultaneously effect recovery of at least 90% of the hydrogen sulfide present in sour refinery gases. It is also apparent that the ratios of moles of hydrogen sulfide absorbed to moles of carbon dioxide absorbed from the sour gas feed range from about 45:1 to 60:1.

EXAMPLE 3

This example represents a successful operation of the process of the present invention conducted in a full scale multitube reactor of the design illustrated in FIG. 3. There was employed a water cooled 100 tube annular flow gas-liquid reactor as illustrated in FIG. 3 in which the 100 reactor tubes consisted of 16 feet Type 304 L 18 gauge stainless steel tubes of 0.75 inch outside diameter and 0.652 inch internal diameter. The distribution header upper zone supplied aqueous sodium hydroxide solution to 100 Type 304 L stainless steel capillary tubes of 0.125 O.D. 0.089 I.D. and approximately 30 inches long mounted as shown in FIG. 3 with bushings and thermocoupled fittings at the header ends and single legged clips of welded and offset sections of capillary tubing to position the capillary tubes within the respective upper ends of the 16 foot ¾" tubes. Refinery gas was supplied to the second header section of the reactor and distributed to the entry of the 100 ¾" tubes as shown in FIG. 3.

The refinery sour gas had an approximate analysis corresponding to the typical gas analysis set out above containing 7.75 mole percent hydrogen sulfide and 2.2 mole percent carbon dioxide and was supplied at a temperature of 80° F. and a pressure of 45 p.s.i.g.

The sodium hydroxide solution feed was a 27.5 percent aqueous solution by weight which was supplied at a temperature of 80° F. and a pressure of 60 p.s.i.g. The feed rate of the refinery gas was maintained at 4600 s.c.f./minute and that of the sodium hydroxide solution was maintained at 13 to 14 gallons per minute during the 10 day period represented by this run. The gas-liquid mixture collected in the lower header was passed by a pipe to a centrifugal separator where separation of the aqueous liquid was made and the aqueous solution thus separated was decanted to a surge tank and storage tank as illustrated in FIG. 1. The product sweet gas was analyzed for its $H_2S$ content and the product solution was analyzed for its composition. The results of such analyses are set out in Table 3A below.

TABLE 3A

| Solution Composition: | Wt. percent |
|---|---|
| NaHS | 29.1 |
| $Na_2S$ | 0 |
| $Na_2CO_3$ | .70 |
| $H_2O$ | 70.2 |
| Percent Removal of $H_2S$ from Sour Gas | 97.5–99.5 |

In another period of operation of the same multi-tube reactor under essentially the same conditions as above a detailed analysis of the refinery sour gas feed to the process and of the corresponding sweet gas product was made. Those comparative gas analyses are set out in Table 3B below.

TABLE 3B

| Component | Mole percent in sour gas feed | Mole percent in sweet gas product |
|---|---|---|
| Hydrogen | 30.3 | 33.0 |
| Methane | 31.0 | 33.7 |
| $C_2HCs$ | 17.6 | 19.1 |
| $C_3HCs$ | 8.0 | 8.7 |
| $C_4HCs$ | 2.0 | 2.2 |
| $C_5HCs$ | 0.8 | 0.9 |
| $C_6$ plus HCs | 0.3 | 0.3 |
| $H_2S$ | 7.8 | 0.2 |
| $CO_2$ | 2.2 | 1.9 |

It is apparent from the data in Table 3A above that the present process is effective to produce aqueous sodium hydrosulfide solutions of useful concentrations subtantially free of sodium carbonate and simultaneously to produce a sweet gas from which at least 95 percent of the hydrogen sulfide present in the sour gas feed has been removed and recovered as such sodium hydrosulfide solution.

What is claimed is:

1. A method of producing useful sodium hydrosulfide solutions substantially free of sodium carbonate from refinery sour gas containing hydrogen sulfide and carbon dioxide which comprises contacting said refinery sour gas with a fresh aqueous sodium hydroxide solution in cocurrent interfacial two-phase flow and separating a sweet gas containing not more than 1.0 percent by weight of hydrogen sulfide at standard conditions and recovering an aqueous solution of sodium hydrosulfide containing not more than 2.0 percent by weight of sodium carbonate.

2. The method of Claim 1 wherein the aqueous hydroxide solution is a solution of from 20 to 40 percent by weight sodium hydroxide and the recovered aqueous solution of sodium hydrosulfide is a solution of from 20 to 40 percent by weight sodium hydrosulfide.

3. The method of Claim 1 wherein the contacting is carried out at a temperature of from 50° to 150° F.

4. The method of Claim 2 wherein the amount of aqueous sodium hydroxide solution contacted ranges from 0.25 to 5 gallons of said solution per 1000 s.c.f. of said refinery sour gas.

5. The method of Claim 1 wherein the said contacting is carried out for a period of from 0.2 to 2 seconds.

6. The method of Claim 1 wherein said refinery sour gas is maintained at a linear velocity of from 60 to 150 feet per second.

7. The method of Claim 3 wherein the contacting is carried out at a temperature of from 50 to 125° F.

8. The method of Claim 2 wherein the aqueous sodium hydroxide solution is a solution of approximately 27.5 percent by weight sodium hydroxide.

9. The method of Claim 4 wherein the amount of aqueous sodium hydroxide solution contacted is approximately 2.7 gallons per 1000 s.c.f. of said refinery sour gas.

10. The method of Claim 5 wherein the said contacting is carried out for a period of less than 1 second.

11. The method of Claim 1 wherein said refinery sour gas is maintained at a linear velocity of 80 to 120 feet per second.

12. The method of Claim 1 wherein the recovered aqueous solution of sodium hydrosulfide is a solution of from about 28 percent to about 32 percent by weight sodium hydrosulfide.

13. The method of Claim 1 wherein the recovered aqueous solution of sodium hydrosulfide contains not more than 1.5 percent by weight sodium carbonate.

14. The method of Claim 12 wherein the recovered aqueous solution of sodium hydrosulfide contains not more than 1 percent by weight sodium carbonate.

15. The method of Claim 1 wherein at least 95 percent of the hydrogen sulfide present in said refinery sour gas is removed from the sweet gas.

16. The method of Claim 1 wherein the said contacting results in a mole ratio of hydrogen sulfide absorbed to carbon dioxide absorbed in said aqueous sodium hydroxide solution of from about 20:1 to 60:1.

References Cited
FOREIGN PATENTS
520,894  1/1956  Canada _____ 423—560

OSCAR R. VERTIZ, Primary Examiner
H. S. MILLER, Assistant Examiner

U.S. Cl. X.R.
23—267; 423—234

UNITED STATES PATENT OFFICE
CERTIFICATE OF CORRECTION

Patent No. 3,839,548                    Dated  October 1, 1974

Inventor(s)  Ronnie Devell Jackson

It is certified that error appears in the above-identified patent and that said Letters Patent are hereby corrected as shown below:

Column 3, line 44, after "use" insert -- in --. Column 4, line 8, "100 s.c.f." should read -- 1000 s.c.f. --; line 43, "reaction" should read -- reactor --. Columns 9 and 10, in Table II under the caption reading "Ratios absorbed, moles $H_2S$/moles $CO_2$", the figure "74.3" should read -- 47.3 --. Column 10, line 47, after "aqueous" insert -- sodium --; line 73, "Claim 1" should read -- Claim 6 --.

Signed and sealed this 3rd day of December 1974.

(SEAL)
Attest:

McCOY M. GIBSON JR.　　　　　　　　　C. MARSHALL DANN
Attesting Officer　　　　　　　　　　Commissioner of Patents